(12) United States Patent
Woolard

(10) Patent No.: US 11,278,921 B2
(45) Date of Patent: Mar. 22, 2022

(54) AEROSOL DISTRIBUTION IN FILTER TESTING SYSTEMS

(71) Applicant: Camfil Aktiebolag, Stockholm (SE)

(72) Inventor: Keith Woolard, Washington, NC (US)

(73) Assignee: Camfil AB, Stockholm (SE)

( * ) Notice: Subject to any disclaimer, the term of this patent is extended or adjusted under 35 U.S.C. 154(b) by 198 days.

(21) Appl. No.: 16/440,593

(22) Filed: Jun. 13, 2019

(65) Prior Publication Data
US 2020/0391233 A1    Dec. 17, 2020

(51) Int. Cl.
| | | |
|---|---|---|
| *B05B 3/12* | (2006.01) | |
| *B01D 46/42* | (2006.01) | |
| *B05B 1/20* | (2006.01) | |
| *G01M 3/20* | (2006.01) | |

(52) U.S. Cl.
CPC ............. *B05B 3/12* (2013.01); *B01D 46/42* (2013.01); *B05B 1/20* (2013.01); *G01M 3/20* (2013.01); *B01D 2273/18* (2013.01)

(58) Field of Classification Search
CPC  B01D 2273/18; B01D 46/0086; B01D 46/42; B05B 3/12; B05B 1/20; G01M 3/20; G01N 2015/084; G01N 15/00
USPC .......................................... 73/863.51, 863.61
See application file for complete search history.

(56) References Cited

U.S. PATENT DOCUMENTS

| | | | | |
|---|---|---|---|---|
| 1,390,310 A | * | 9/1921 | Plumer ..................... | B05B 3/06 239/253 |
| 2,301,025 A | * | 11/1942 | Friend ..................... | C02F 3/043 261/95 |
| 2,347,739 A | * | 5/1944 | Higgins ............... | A01K 13/003 119/669 |
| 2,910,865 A | * | 11/1959 | Opdyke .................. | G01P 5/001 73/147 |
| 3,215,274 A | * | 11/1965 | Schreiber ................ | C02F 3/043 210/150 |
| 3,361,361 A | * | 1/1968 | Schutte .................... | A47L 15/23 239/227 |
| 3,803,921 A | * | 4/1974 | Dieterich ............. | G01N 1/2035 73/203 |
| 4,055,075 A | * | 10/1977 | Allan ...................... | G01M 3/00 73/40.7 |
| 4,494,403 A | * | 1/1985 | Bowers .............. | B01D 46/0006 73/40.7 |
| 4,515,007 A | * | 5/1985 | Herman .................. | G01M 3/20 55/DIG. 9 |

(Continued)

*Primary Examiner* — David A. Rogers
(74) *Attorney, Agent, or Firm* — Patterson + Sheridan, LLP

(57) ABSTRACT

An aerosol distributor for filter leakage detection in a gas filtration system, said aerosol distributor being configured to be positioned in a gas stream upstream of the filter, said aerosol distributor comprising: a rotatable distributor housing comprising a hub in fluid connection with two or more radial chambers evenly distributed around said hub, the distributor housing having an inlet for admitting a test aerosol from an aerosol source via the hub into the radial chambers, each radial chamber being elongated, sealed at a distal end, and provided with a plurality of outlet holes distributed along the length thereof for releasing the aerosol from the radial chamber into a gas stream surrounding the aerosol distributor, and wherein said aerosol distributor further comprises an actuator configured to rotate the distributor housing around a central axis thereof.

18 Claims, 5 Drawing Sheets

(56) References Cited

U.S. PATENT DOCUMENTS

| | | | | |
|---|---|---|---|---|
| RE31,952 E * | 7/1985 | Wilcox | ............ | B01D 46/0004 239/514 |
| 4,683,762 A * | 8/1987 | Aurich | .................. | G01M 3/20 73/40.7 |
| 4,884,585 A * | 12/1989 | Oh | ........................ | A47L 15/20 134/176 |
| 5,124,133 A * | 6/1992 | Schoenrock | .......... | B01D 15/08 210/286 |
| 7,186,286 B2 | 3/2007 | Morse | | |
| 7,669,490 B2 * | 3/2010 | Yoshitome | ............. | F24F 3/167 73/865.8 |
| 8,133,310 B2 * | 3/2012 | Huza | ................ | B01D 46/4272 96/413 |
| 9,186,610 B2 * | 11/2015 | Woolard | ........... | B01D 46/0086 |
| 9,468,880 B2 | 10/2016 | Woolard et al. | | |
| 9,772,271 B2 * | 9/2017 | Peacock | ................ | G01N 15/06 |
| 10,006,848 B2 * | 6/2018 | Woolard | .......... | G01N 15/0806 |
| 10,137,549 B2 * | 11/2018 | Koik | ................ | B23Q 11/1046 |
| 10,578,521 B1 * | 3/2020 | Dinakaran | ........... | G01N 1/2205 |
| 2006/0042359 A1 | 3/2006 | Morse et al. | | |
| 2006/0272301 A1 * | 12/2006 | Morse | ................ | B01D 46/444 55/439 |
| 2010/0154513 A1 * | 6/2010 | Lin | ....................... | B01D 46/42 73/38 |
| 2013/0192344 A1 * | 8/2013 | Bryan | ............... | B01D 39/1692 73/38 |
| 2015/0352605 A1 * | 12/2015 | Tiwari | ................... | A61M 1/06 134/105 |
| 2016/0097706 A1 | 4/2016 | Woolard et al. | | |
| 2016/0256809 A1 * | 9/2016 | Woolard | ................ | B01D 46/10 |
| 2016/0297042 A1 * | 10/2016 | Koik | ................. | B23Q 11/1076 |
| 2016/0324393 A1 * | 11/2016 | Xu | .......................... | A47L 15/22 |
| 2019/0053686 A1 * | 2/2019 | Weigle | ................. | A47L 15/488 |
| 2019/0265122 A1 * | 8/2019 | Kawasaki | ............. | G01N 15/08 |
| 2020/0022795 A1 * | 1/2020 | Haupt | ...................... | A01K 1/06 |
| 2020/0289971 A1 * | 9/2020 | Mahler | ................ | B01D 46/442 |
| 2020/0292405 A1 * | 9/2020 | Petersen | ........... | G01N 15/0806 |
| 2020/0391233 A1 * | 12/2020 | Woolard | ............. | B01D 46/442 |
| 2020/0400545 A1 * | 12/2020 | Berryessa | ........... | G01N 15/082 |

\* cited by examiner

AEROSOL DISTRIBUTION IN FILTER TESTING SYSTEMS

BACKGROUND

Field

The present invention relates generally to arrangements for filter leakage detection in gas filtration systems, and more specifically to aerosol distributors for achieving an even distribution of a test aerosol in the gas stream upstream of the filter to be tested.

Description of the Related Art

In some environments where undesired substances are removed from a gas, such as air, by filtering the gas, it is important to be able to check in situ that the filter is working and detect any leakage of the filter. One way of checking the filter is to use a filter testing system, wherein a particulate test substance, typically an aerosol, is injected into the gas stream upstream of the filter, and gas is collected downstream of the filter using a sampling probe. The collected gas is then analyzed with respect to occurrence of the undesired substance.

Testing of filters and filter installations for removal of particles from a gas can for example utilize a monodisperse or polydisperse aerosol of an oil, e.g. dioctyl phthalate (DOP), di-ethyl-hexyl-sebacat (DENS) or poly alpha olefins (PAO). Other typical aerosols used are an aerosol of solid particles of e.g. salt or silica, an aerosol of a polystyrene latex, or an aerosol of viable or non-viable cells. For the testing of molecular filters, gaseous challenge compounds, e.g. toluene or butane in air may also be used. The aerosol is introduced into the gas stream at a point in the duct far enough upstream of the filter or filter bank to assure complete dispersion by the time it reaches the filter or bank of filters.

An upstream sampling probe is often provided immediately upstream of the filter to determine the concentration of the aerosol in the duct, and a downstream sampling probe is provided to detect filter leakage. During testing, a portion of the gas stream is withdrawn from the duct through the sampling probes and conveyed to an external instrument, such as a photometer or a particle counter or the like, which is used to determine the aerosol concentration in both the upstream and downstream samples.

The downstream sampling probe may be movable in a plane parallel to the filter surface, such that the filter surface can be scanned using the sampling probe. This type of scanning sampling probe allows detection of not only the existence of a leak, but can also give rough indication as to the position of the leak on the filter surface. A typical sampling probe is made of a tube with several inlet holes through the tube wall distributed along the length of the sampling probe, and a central outlet.

For improved leak detection, the aerosol particles are evenly distributed in the gas flow when it reaches the filter so that the aerosol particle load is evenly distributed across the filter area. If the filter is subjected to an uneven particle distribution, e.g. a higher particle concentration towards the middle of the filter and a lower concentration towards the filter edges, this may cause a lower sensitivity to leaks at the edges of the filter compared to leaks positioned closer to the middle of the filter, and an overestimation of the overall filter efficiency.

If the test aerosol is injected into the gas stream via a single injection point, the injection point must be positioned sufficiently far from the filter to allow the aerosol particles to become evenly distributed before they reach the filter surface. This may drastically increase the space requirements of the filter testing system. In installations where multiple filters are employed in series, the space requirements for introducing the test substance, and withdrawing the samples, are multiplied since the filters must be separated by a distance sufficient to allow proper particle distribution.

Generally, for the aerosol to be completely mixed with the surrounding airflow, the aerosol should be introduced into the airflow at a point that is upstream of the location where it needs to be completely mixed by at least 10 cross-sectional dimensions of the duct through which the airflow is traveling. However, such dimensional requirements can result in a test section that is significantly longer than a conventional filter arrangement, which undesirably requires a larger foot print along with increased material costs. Alternatively, baffles or other mixing elements may be disposed between the aerosol injection point and the filter to provide adequate mixing over a shorter length. However, the addition of mixing elements may significantly restrict the airflow through the filter arrangement. Thus, a larger fan, blower, or the like is used, which uses more power to achieve a desired airflow, than if such mixing elements were not present. The larger fan increases equipment cost, while the increased airflow resistance consumes more energy, making the system more expensive to operate.

While the aerosol distributor should provide a uniform particle distribution, it is also important that the contribution of the aerosol distributor to the overall pressure drop over the filter testing system is as low as possible.

A common solution for improving aerosol particle distribution in filter testing systems includes an arrangement of interconnected perforated tubes connected to an aerosol source. Aerosol from the aerosol source is fed to the tubes and distributed into the gas stream via the perforations. However, this type of arrangement typically does not result in a satisfactory distribution, since a higher amount of particle will pass though the perforations closest to the aerosol source and a lower amount of particles will pass though the perforations further away from the aerosol source.

Thus, there is a need for an improved aerosol distribution in filter testing systems which allow the aerosol distributor to be placed close to the filter surface while providing efficient aerosol particle distribution with a low pressure drop.

SUMMARY

The present invention generally relates to an aerosol distribution system for testing filters and a method for using the same. According to a first aspect of the disclosure, there is provided an aerosol distributor for filter leakage detection in a gas filtration system, said aerosol distributor being configured to be positioned in a gas stream upstream of the filter, said aerosol distributor comprising a rotatable distributor housing comprising a hub in fluid connection with two or more radial chambers evenly distributed around said hub, the distributor housing having an inlet for admitting a test aerosol from an aerosol source via the hub into the radial chambers, each radial chamber being elongated, sealed at a distal end, and provided with a plurality of outlet holes distributed along the length thereof for releasing the aerosol from the radial chamber into a gas stream surrounding the aerosol distributor, and wherein said aerosol distributor further comprises an actuator configured to rotate the distributor housing around a central axis thereof.

According to a second aspect of the disclosure, there is provided an arrangement for filter leakage detection in a gas filtration system, comprising a filter housing for sealably mounting a filter within said filter housing such that a gas stream passing through the filter housing passes through the filter, and an aerosol distributor mounted in the gas stream upstream of the filter for releasing a test aerosol from an aerosol source into the gas stream, wherein the aerosol distributor comprises a rotatable distributor housing comprising a hub in fluid connection with two or more radial chambers evenly distributed around said hub, the distributor housing having an inlet for admitting a test aerosol from an aerosol source via the hub into the radial chambers, each radial chamber being elongated, sealed at a distal end, and provided with a plurality of outlet holes distributed along the length thereof for releasing the aerosol from the radial chamber into a gas stream surrounding the aerosol distributor, and wherein said aerosol distributor further comprises an actuator configured to rotate the housing around a central axis thereof.

According to a third aspect of the disclosure, there is provided a method of filter leakage detection in a gas filtration system comprising the steps of distributing a test aerosol in a gas stream upstream of a filter, passing the gas stream containing the test aerosol through the filter, and sampling gas from the gas stream downstream of the filter and analyzing the gas for presence of test aerosol, wherein the test aerosol is distributed using an aerosol distributor as defined above with reference to the first aspect of the disclosure.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
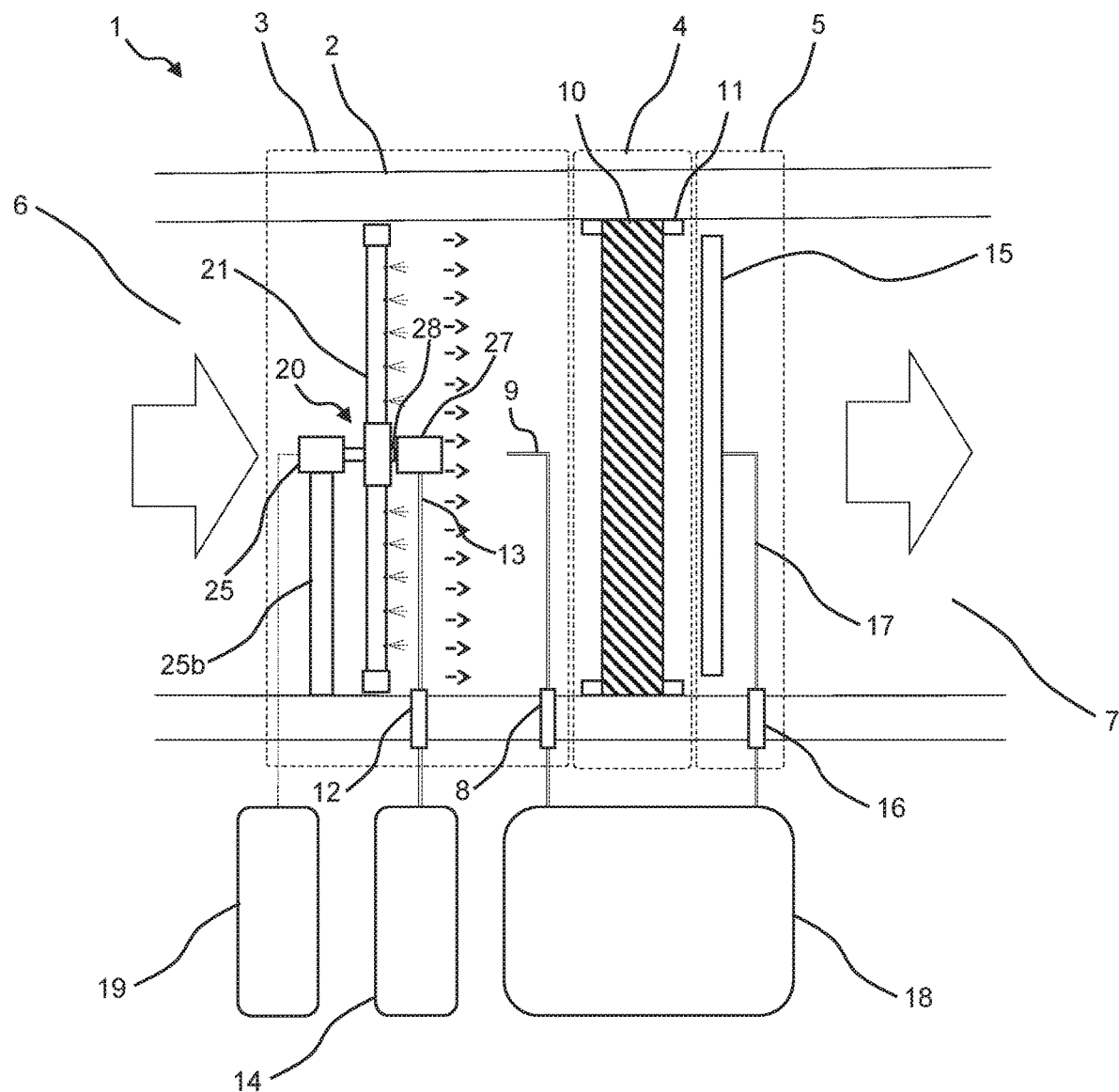
FIG. 1 is a schematic view of a gas filtration system having an arrangement for filter leakage detection.

One object of the present disclosure is to provide an aerosol distributor for use in a filter testing system, which alleviates at least some of the problems associated with prior art aerosol distributors. Another object of the present disclosure is to provide an aerosol distributor which combines the properties of efficient aerosol particle distribution while allowing the aerosol distributor to be placed close to the filter surface and have a low pressure drop. The above objects as well as other objects that will become apparent to the skilled person in the light of the present disclosure are achieved by the various aspects of the invention as set out herein.

The aerosol distributor can be permanently mounted upstream of a filter in a filter housing where the filter integrity needs to be tested regularly or occasionally. The aerosol distributor function is to distribute an aerosol, e.g. in the form of a carrier stream containing a very fine aerosol of oil particles through a number of small outlet holes into the gas flow upstream of the filter. The aerosol may for example be a monodisperse or polydisperse aerosol of an oil, e.g. dioctyl phthalate (DOP), di-ethyl-hexyl-sebacat (DEHS) or poly alpha olefins (PAO). Other examples of aerosols that may be used include an aerosol of solid particles of e.g. salt or silica, an aerosol of a polystyrene latex, or an aerosol of viable or non-viable cells. For the testing of molecular filters, gaseous challenge compounds, e.g. toluene or butane in air may also be used. Downstream of the filter, an aerosol sampling probe is typically used to detect filter leakage. In order for the leak detection to be accurate, it is important that the aerosol particles are evenly distributed in the gas flow when it reaches the filter so that the aerosol particle load is evenly distributed across the filter area.

The aerosol distributor having a rotatable distributor housing has been found to provide a significant improvement in the aerosol distribution compared to prior art aerosol distributors. The inventive aerosol distributor has been found to reduce the particle distribution deviation across the duct cross section, and as a result across the filter area, to less than 8%, which can be compared to about 30% with a prior art aerosol distributor. The rotating motion of the distributor housing serves to spread the aerosol over the entire cross section of filter housing, as well as to mix aerosol into the gas stream, resulting in a more even distribution of aerosol in the gas downstream of the aerosol distributor.

The reduction of the particle distribution deviation obtained with the rotating distributor housing design allows the particle distributor to be placed closer to the filter surface, which in turn allows for a reduction of the build depth and reduced size of the filter testing arrangement. A corresponding prior art gas distributor typically requires a distance of at least 400 mm from the upstream surface of the filter. With the rotating distributor housing design, this distance may be considerably reduced.

With the aerosol distributor, a significant improvement of the aerosol distribution can be achieved without an increase in pressure drop, or even with a reduction in pressure drop, since the aerosol distributor can be designed with similar or smaller exterior dimensions than a conventional perforated tube aerosol distributor.

Rotational motion of the aerosol distributor housing is effected by an actuator configured to rotate the distributor housing around a central axis thereof. The actuator may for example comprise an electric motor or a pneumatic motor. The actuator is preferably connected via a drive shaft to the hub. The best results in terms of even aerosol distribution have been achieved when the aerosol distributor housing is rotated at relatively high rotational speeds, e.g. at a rotational speed of about 100 rpm or higher. This is believed to be due to a favorable combination of an even spreading of the aerosol over the entire cross section of filter housing and the mixing action effected by the rotating distributor housing at higher rotational speeds. Therefore, in some embodiments the actuator is configured to rotate the distributor housing at a rotational speed in the range of about 100 rpm to about 10000 rpm, preferably in the range of about 500 rpm to about 2000 rpm, and more preferably in the range of about 800 rpm to about 1200 rpm.

The rotatable distributor housing comprises a hub in fluid connection with two or more radial chambers evenly distributed around said hub and has an inlet for admitting a test aerosol from an aerosol source via the hub into the radial chambers. The radial chambers may be in the form of two or more distinct chambers, each being fluidly connected to the hub, or in the form of two or more sections of the same chamber, each chamber or chamber section extending radially from the hub.

Thus, in a simple embodiment, the rotatable distributor housing could be in the form of a tube, sealed at both ends, with a hub for rotation of the distributor housing and an inlet for aerosol located at a rotation axis centrally between said ends, such that two elongated radial chamber portions extending in opposite radial directions from the hub are formed, each chamber portion having a plurality of outlet holes distributed along the length thereof.

In some embodiments, the hub may be in the form of a manifold comprising a hub chamber fluidly connecting the inlet to the radial chambers. The inlet is preferably arranged centrally with reference to the central axis of the distributor housing and configured to be connected to an aerosol source via a rotating joint, e.g. a swivel joint, such that the aerosol can be fed to the distributor housing during rotation.

The aerosol distributor housing comprises two or more radial chambers evenly distributed around said hub. By the term "evenly distributed around said hub" it is meant that the radial chambers are arranged around the hub in a common plane, such that an angle between each adjacent pair of radial chambers is substantially the same.

Having two or more radial chambers allows for the outlet holes to be evenly distributed across a cross-sectional area of the gas stream. This way, aerosol can be evenly distributed into the gas stream. In some embodiments, the aerosol distributor housing comprises 2-20 radial chambers, preferably 3-16 radial chambers, more preferably 4-12 radial chambers. Having 4-12 radial chambers has been found to provide a suitable combination of even aerosol distribution and low pressure drop.

The outlet holes can be single holes, groups of holes or slots of different geometries. In a preferred embodiment, the outlet holes are discrete circular holes. The outlet holes are distributed along the length of the radial chambers, between a proximal end attached to and in fluid connection with the hub, and a sealed distal end. In some embodiments, the outlet holes are arranged on surfaces of the radial chambers that constitute trailing surfaces of the radial chambers in an operational state, i.e. the holes face away from the direction of rotation.

While the aerosol distributor should provide a uniform particle distribution, it is also important that the contribution of the aerosol distributor to the overall pressure drop over the filter testing system is as low as possible. The shape of the distributor housing should therefore preferably be designed for minimum gas flow resistance. Therefore, in some embodiments, the radial chambers are tubular.

The inventive filter testing system is applicable for filter housings of any size, but since the problems associated with uneven distribution of the test aerosol increase with increasing inner diameter of the filter housing, it has been found that the filter testing system is especially useful where the filter housing has an inner diameter of at least 250 mm. Accordingly, a suitable length of the radial chambers will typically be in the range of about 100 mm to about 1000 mm.

The effect of the inventive rotating distributor housing design is believed to be especially pronounced because of the typically relatively low pressure of the aerosol that is fed to the aerosol distributor. The aerosol pressure from the aerosol source is typically in the range of about 0.1 bar to about 5 bar, preferably in the range of about 0.2 bar to about 3 bar. Thus, in some embodiments, the aerosol distributor further comprises an aerosol source capable of feeding a test aerosol to the inlet of the distributor housing at a pressure in the range of about 0.1 bar to about 5 bar, preferably in the range of about 0.2 bar to about 3 bar.

The aerosol distributor of the arrangement of the second aspect may be further defined as described above with reference to the first aspect of the disclosure. The filter housing of the arrangement may have any cross sectional geometry, but is typically square or round. The aerosol distributor is particularly suitable for gas flow paths having a round or rounded cross sectional geometry, e.g. cylindrical ducts or filter housings having an axial gas flow path. Accordingly, in some embodiments, the filter housing is cylindrical and has an axial flow path.

In many cases, the gas filtration system of the arrangement comprises a filter and filter housing having a square cross section and an upstream duct having a round cross section, wherein the duct is connected to the filter housing by a round to square transition. In these cases, the aerosol distributor may preferably be placed in the duct having a round cross section.

The filter testing system is applicable for filter housings of any size, but since the problems associated with uneven distribution of the test aerosol increase with increasing inner diameter of the filter housing, it has been found that the filter testing system is especially useful where the filter housing has an inner diameter or width of at least 250 mm, and preferably in the range of about 250 mm to about 1300 mm.

The aerosol distributor housing is preferably configured to rotate around a central axis thereof, which coincides with a central axis of the duct or filter housing. The aerosol distributor may be placed at a conventional distance from the filter (typically about 400 mm) to provide improved aerosol distribution compared to a conventional aerosol distributor, or it can be placed closer to the filter to provide the same or better aerosol distribution compared to a conventional aerosol distributor, but with reduced build depth. In some embodiments, the distance of the aerosol distributor from said filter is in the range of about 50 mm to about 500 mm, preferably in the range of about 50 mm to about 250 mm. In gas filtration systems comprising a filter and filter housing having a square cross section and an upstream duct having a round cross section, wherein the duct is connected to the filter housing by a round to square transition, the aerosol distributor may preferably be placed in the duct having a round cross section.

Downstream of the filter, an aerosol sampling probe is typically used to detect filter leakage. Thus, in some embodiments, the filter testing system further comprises a sampling probe positioned in the gas stream downstream of the filter for sampling gas from the gas stream to be analyzed for the presence of test aerosol.

The sampling probe can be provided in many different forms and may be fixed or movable. In some embodiments, the sampling probe is movable in a plane parallel to the filter surface, such that the filter surface can be scanned using the sampling probe.

Since it is desirable that the sampling probe does not noticeably interfere with the gas flow it cannot cover the whole area. Different concepts of sampling probes which are moved to scan the filter area have been developed. One kind thereof, particularly suitable for filters and filter housings having a square cross section, is an elongated sampling probe, which extends along the length or width of the filter and is moved back and forth perpendicularly of its longitudinal extension to scan the area in the vicinity of the filter surface. A typical elongated sampling probe is made of a tube with several inlet holes through the tube wall distributed along the length of the sampling probe, and a central outlet. This type of sampling probe allows detection of not only the existence of a leak, but can also give rough indication as to the position of the leak on the filter surface.

In some embodiments, the sampling probe instead comprises a series of discrete probes evenly distributed across a cross-sectional area of the filter housing, wherein each discrete probe can be analyzed independently. The series of discrete probes thereby allows detection of not only the existence of a leak, but can also give rough indication as to the position of the leak on the filter surface. This type of sampling probe is useful for filters and filter housings having a square or round cross section.

In some cases, especially with a movable sampling probe arranged to scan the filter surface, or a series of discrete probes, it is preferred that the sampling probe is placed close to the filter surface. In some embodiments, the distance of the sampling probe from said filter is in the range of about 5 mm to about 100 mm, preferably in the range of about 5 mm to about 25 mm.

The gas filtration system of the method according to third aspect may be further defined as described above with reference to the second aspect of the disclosure. In preferred embodiments of the method, the aerosol distributor housing is rotated at a rotational speed in the range of about 100 rpm to about 10000 rpm, preferably in the range of about 500 rpm to about 2000 rpm, more preferably in the range of about 800 rpm to about 1200 rpm.

The aerosol pressure from the aerosol source is typically in the range of about 0.1 bar to about 5 bar, preferably in the range of about 0.2 bar to about 3 bar. Thus, in some embodiments, the aerosol source feeds a test aerosol to the inlet of the distributor housing at a pressure in the range of about 0.1 bar to about 5 bar, preferably in the range of about 0.2 bar to about 3 bar.

Various embodiments of the invention will now be described more in detail with reference to the drawings.

FIG. 1 illustrates a gas filtration system 1, specifically an air filtration system, comprising an arrangement for filter leakage detection according to various embodiments. The air filtration system 1 includes a filter housing 2 having an upstream test section 3, a filter section 4, and a downstream test section 5 arranged in series. The air filtration system 1 includes an airflow inlet aperture 6 at the upstream end and an airflow outlet aperture 7 at the downstream end.

The filter housing 2 can include one or more doors (not shown) that can be opened to permit access to filters contained therein. The filter housing 2 also includes an upstream sample port 8 formed therethrough, and an upstream sampling probe 9 to allow samples of the aerosol concentration in the airflow upstream of the filter 10 to be obtained during filter testing. The filter section 4 of the filter housing 2 includes a filter mounting mechanism 11 that is substantially aligned with the doors. The filter mounting mechanism receives the filter 10 disposed in the filter section 4 through the doors and can be actuated to sealingly retain the filter 10 in a position within the filter section such that air entering the air filtration system through the airflow inlet aperture 6 and exiting the airflow outlet aperture 7 must pass through and be filtered by the filter 10. The filter mounting mechanism 11 may be any suitable filter clamping mechanism utilized in commercially available gas filtration systems, or other suitable filter clamping system.

The upstream test section 3 is arranged between the airflow inlet aperture 6 and the filter section 4 and includes a duct forming a passageway directing the airflow from the airflow inlet aperture 6 to the filter housing section 4. An aerosol distributor 20 is arranged in the passageway. Optionally, mixing elements (not shown) in the form of baffles may be disposed between the aerosol distributor 20 and the filter 10 to provide additional mixing. The aerosol distributor 20 can be connected to and in fluid communication with an aerosol port 12 arranged through the filter housing 2 wall. An aerosol inlet 28 of the aerosol distributor housing 21 can be connected to the aerosol port 12 by a connecting tube 13 and one-way flow rotating joint 27. The connecting tube 13 may include rigid or flexible tubing adapted to connect the aerosol distributor 20 to the aerosol port 12. Aerosol can be introduced into the aerosol port 12 and travel through the connecting tube 13 via the one-way flow rotating joint 27 into the aerosol distributor housing 21.

The basic constructional features of an embodiment of the aerosol distributor 20 according to the present disclosure are illustrated with reference to FIG. 2. The aerosol distributor housing 21 may be assembled from two or more parts, e.g. a first part comprising the hub 22 chamber acting as a manifold to which a number of radial chambers 23 can be fixed, e.g. by gluing or welding or screwing. The inlet and outlet holes can for example be prepared by drilling.

The aerosol distributor 20 is comprised of a distributor housing 21 made of metal or plastic comprising a hub in the form of a central hub chamber 22, having a substantially cylindrical shape, and a series of elongated tubular radial chambers 23 attached to the hub chamber around a peripheral surface thereof. Each radial chamber 23 is fixed to, and in fluid connection with, the hub chamber 22 at a first proximal end and sealed at the opposite distal end. The aerosol distributor housing 21 is arranged to rotate around a central axis S thereof, which central axis S coincides with a central axis of the filter housing. The length of the radial chambers 23 is selected such that the diameter of the distributor housing 21 during rotation, is slightly smaller than the inside diameter of the duct.

Figure 2:
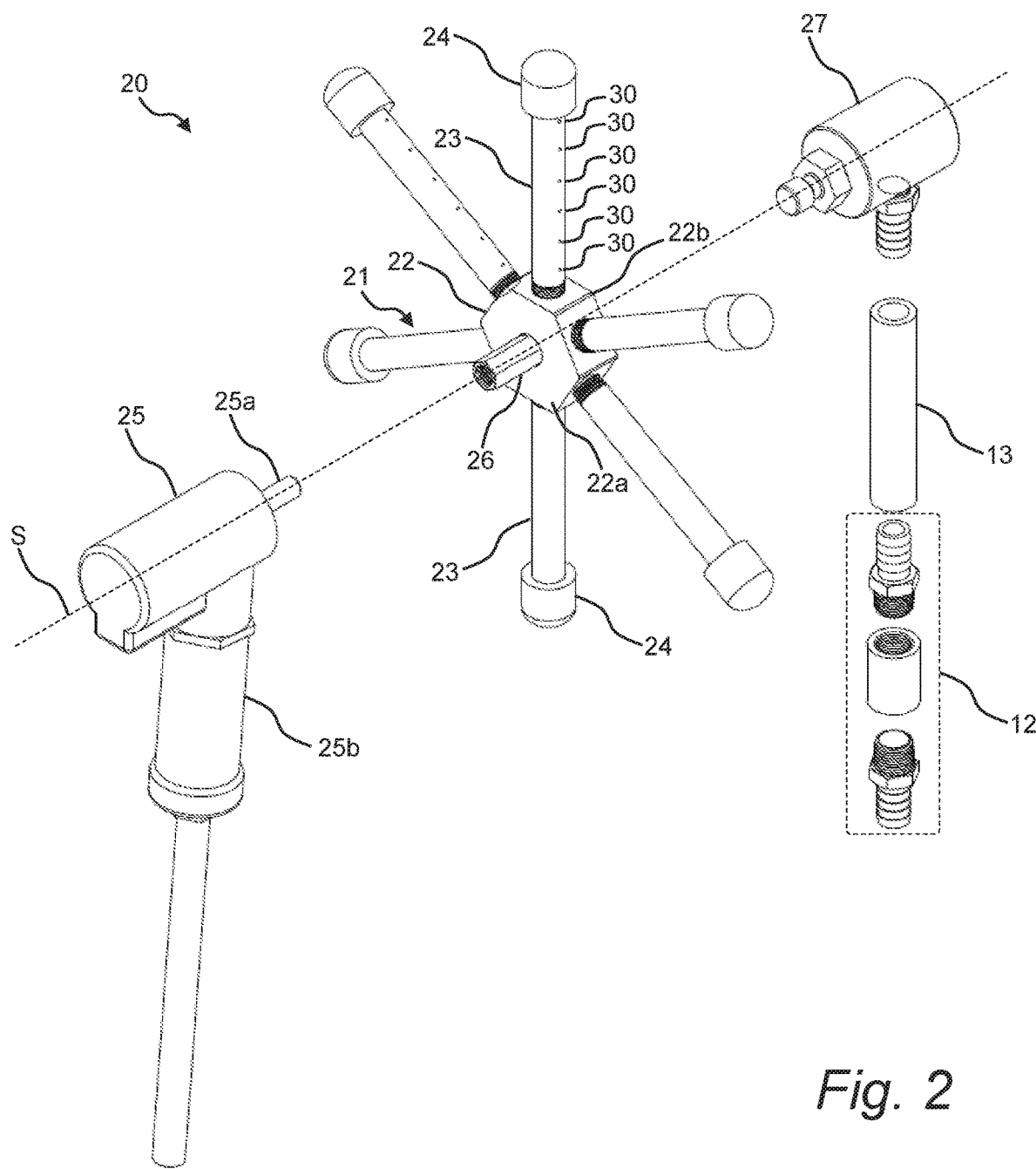
FIG. 2 is an exploded view of an aerosol distributor according to the invention.
Figure 3A:
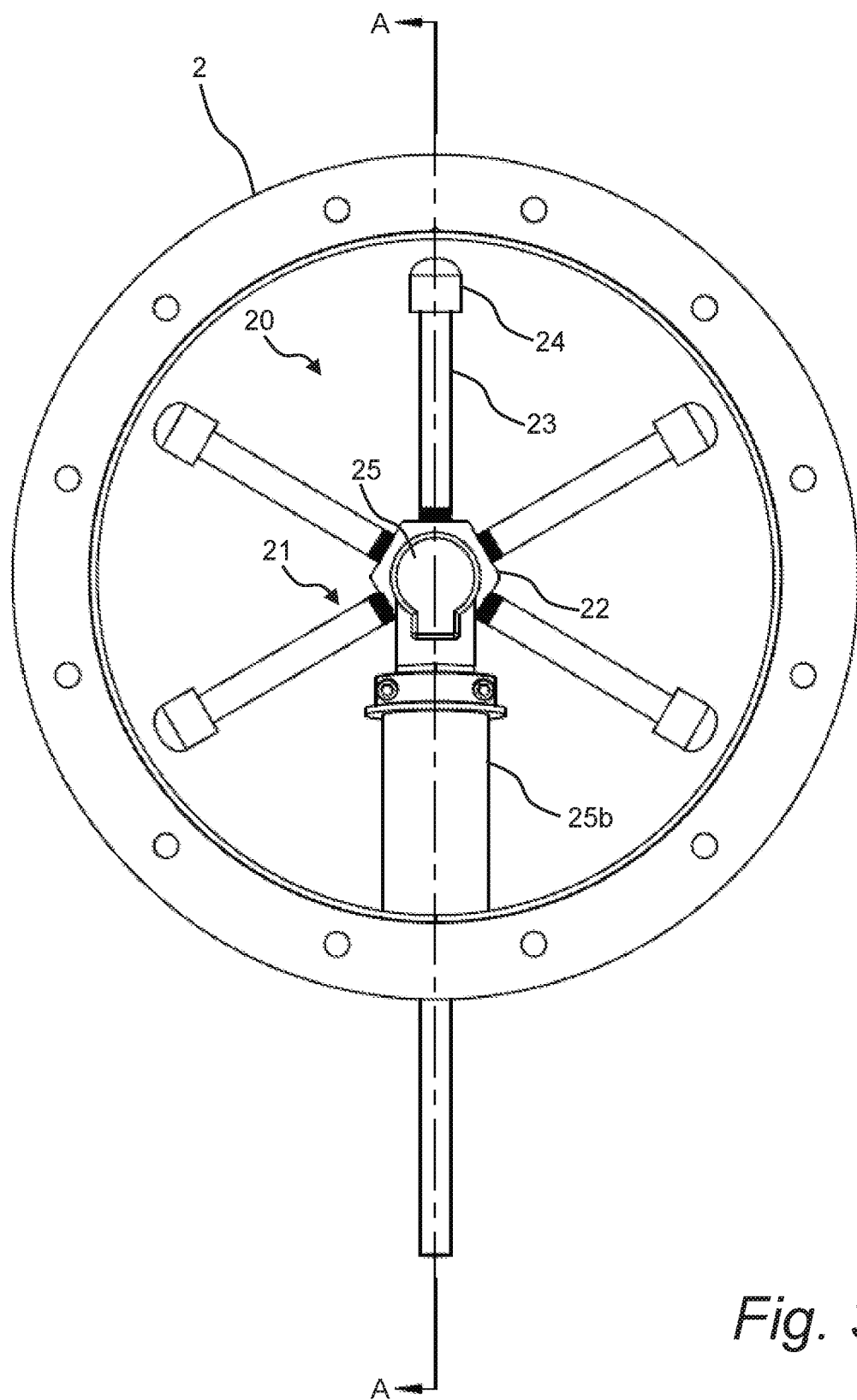
FIG. 3a is a view of an aerosol distributor according to the invention from the upstream side.
Figure 3B:
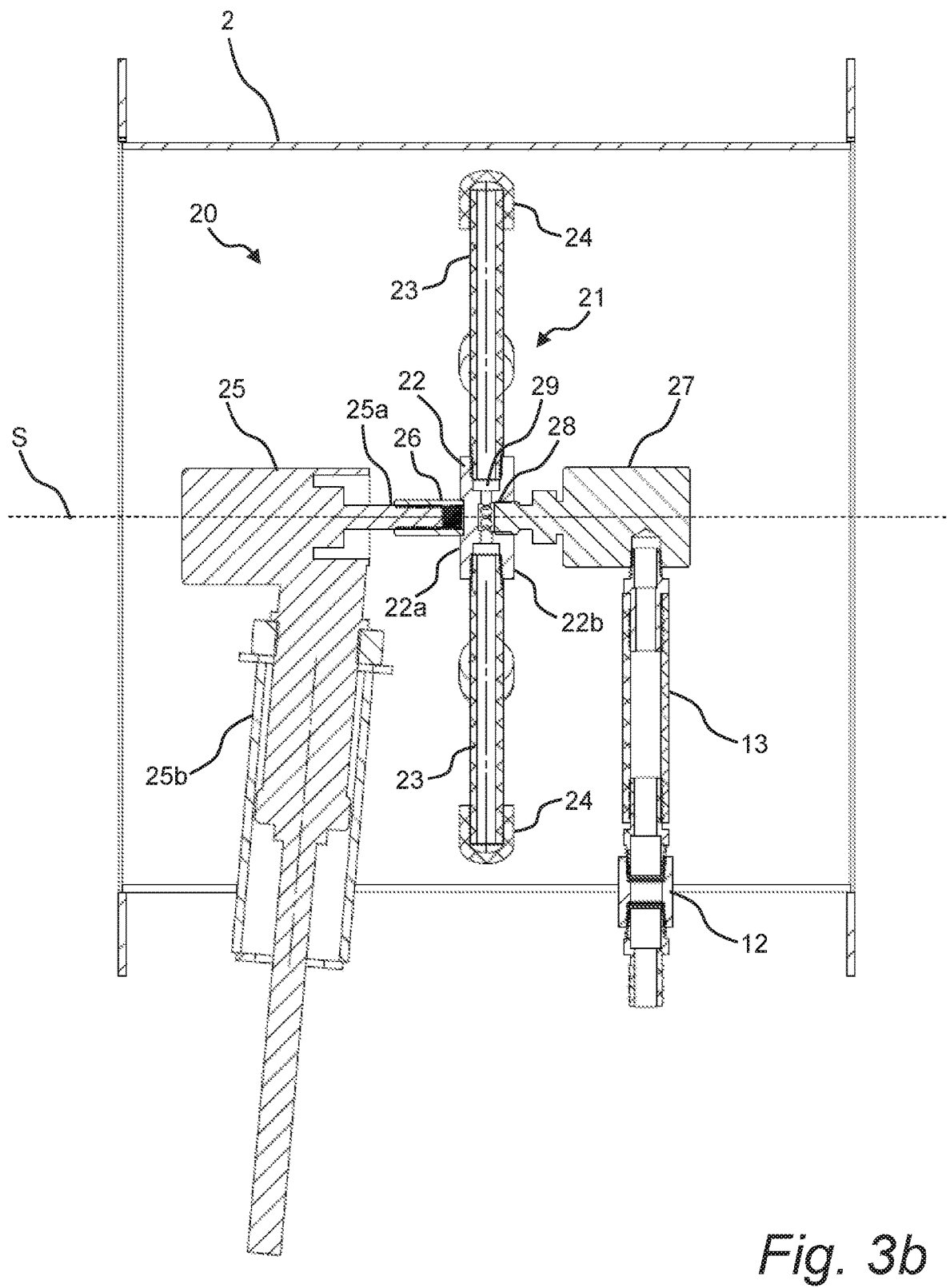
FIG. 3b is a cross sectional view of section A-A of an aerosol distributor according to the invention.

The aerosol distributor 20 of FIG. 2 is configured to be fitted in a cylindrical duct as shown in FIGS. 3a and 3b. The radial chambers 23 are of equal length and attached to the hub chamber 21 so as to form a wheel-like structure. The radial chambers 23 are formed of metal tubes, threaded at both ends, as shown in detail in FIGS. 4a and 4b. The threading allows the chambers to be fastened to correspondingly threaded sockets in the hub chamber 22 at one end, and sealed using correspondingly threaded end caps 24 at the opposite end. With this configuration, the aerosol distributor housing 21 can be readily disassembled for cleaning and maintenance.

Rotation of the aerosol distributor housing 21 is effected by an actuator in the form of an electric or pneumatic motor 25 connected to a connector 26 attached to a first end portion 22a of the hub chamber via a drive shaft 25a. In the embodiment of FIG. 2 the aerosol distributor housing 21 is suspended in the duct by the drive shaft 25a, motor 25 and motor mount 25b fixed to the duct wall. The motor 25 is powered by a power source 19 in the form of an electric power supply (in the case of an electric motor) or in the form of compressed air (in the case of a pneumatic motor). Although in the embodiments shown in the figures the motor in is placed inside of the duct, i.e. internal to the boundary, it is understood that the motor may also be placed outside of the duct, i.e. external to the boundary, and mechanically linked to the aerosol distributor housing 21.

FIG. 3b is a cross sectional view of section A-A of FIG. 3a. As shown in FIG. 3b, the hub chamber 22 has an inlet 28 for admitting a test aerosol from an aerosol source 14 via the aerosol port 12 and connecting tube 13 and via the one-way flow rotating joint 27 into the hub chamber 22. The inlet 28 is arranged on a second end portion 22b of the hub chamber 22, opposite to the first end. The one-way flow rotating joint 27 includes a swivel joint, such that the aerosol can be fed to the distributor housing 21 during rotation. The hub chamber 22 comprises passages 29 through which the test aerosol can pass into the radial chambers 23.

Figure 4A:
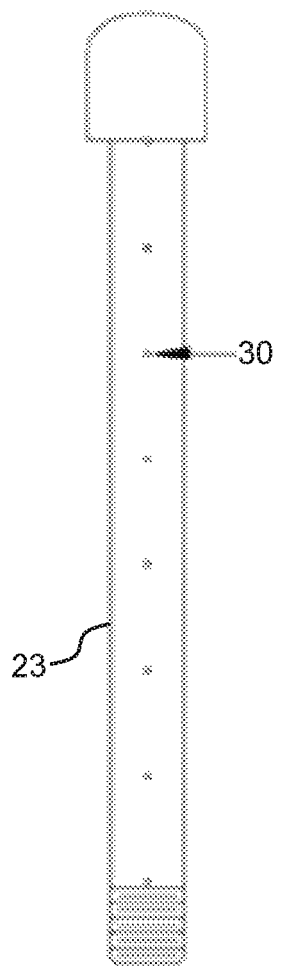
FIG. 4a and FIG. 4b depict radial chambers of an aerosol distributor according to the invention with offset outlet holes.
Figure 4B:
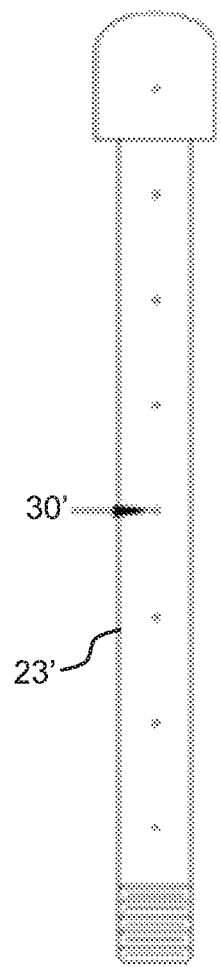

The radial chambers 23 are provided with a plurality of outlet holes 30 for releasing the test aerosol from the radial chambers 23 into the passageway surrounding the aerosol distributor 20. The holes 30 can be single holes, groups of holes or slots of different geometries. In the embodiment of FIG. 2 the outlet holes are provided in the form of discrete circular holes. As shown in FIGS. 4a and 4b, the outlet holes 30 are distributed along the length of the radial chambers, between a proximal end attached to and in fluid connection with the hub chamber 22, and a sealed distal end. In order to further improve the aerosol distribution, the holes of different radial chambers may be radially offset, such that the holes 30 of one radial chamber 23 (FIG. 4a) are not positioned at the same distance from the central axis S of the distributor housing 21 as the holes 30' of another radial chamber 23' (FIG. 4b). In some embodiments, the outlet holes are arranged on surfaces of the radial chambers that constitute trailing surfaces of the radial chambers in an operational state.

The outlet holes typically have a diameter in the range of about 0.5 mm to about 5 mm. The diameter of the outlet holes 30 in FIG. 2 is about 1.1 mm. The distributor housing 21 of the aerosol distributor 20 is preferably designed such that when it is rotated, the outlet holes 30 are evenly distributed across a cross-sectional area of the passageway. This way, the aerosol is evenly distributed into the airflow.

The shape of the aerosol distributor is preferably selected so as to correspond to the duct or filter cabinet in which it is to be fitted. Obviously, the circular profile formed by the distributor housing during rotation makes it very useful in ducts and cabinets having a round cross sectional geometry. However, the rotational movement of the distributor housing efficiently spreads the aerosol, making the aerosol distributor useful also in ducts and cabinets having other, e.g. square, cross sectional geometries. In a duct or cabinet having a cross sectional geometries other than circular, a restriction having a circular opening corresponding to the rotational diameter of the distributor housing may optionally be provided to direct the air in the duct towards the aerosol distributor. In many cases, the gas filtration system comprises a filter and filter housing having a square cross section and an upstream duct having a round cross section, wherein the duct is connected to the filter housing by a round to square transition. In these cases, the aerosol distributor may preferably be placed in the duct having a round cross section.

The distributor housing 21 of the aerosol distributor 20 may typically have an overall diameter during rotation in the range of about 100 mm to about 1300 mm, preferably in the range of about 250 mm to about 650 mm.

As an example, as shown in FIG. 2 the outer dimensions of the distributor housing 21 may be selected such that the distributor housing fits in and substantially covers the cross section of the duct during rotation. The distributor housing may for example comprise 6 radial chambers 23 evenly distributed along the hub chamber 22. Each radial chamber may comprise 8 outlet holes distributed along the length of each primary chamber, resulting in the distributor housing having 48 outlet holes distributed across a cross-sectional area of the passageway.

For rotational balance at the relatively high rotational speeds used, the distributor housing is preferably designed with at least two radial chambers. In alternative embodiments, the distributor housing may comprise 2, 3, 4, 5, 6, 7, or 8 radial chambers evenly distributed along the hub. The radial chambers are preferably designed and spaced so as to provide rotational balance and minimize vibration during rotation.

Via the aerosol port 12, the aerosol distributor 21 can be connected to an aerosol source 14 adapted to feed a test aerosol to the inlet of the distributor housing at a pressure in the range of about 0.1 bar to about 5 bar, preferably in the range of about 0.2 bar to about 3 bar.

The gas filtration system 1 may further be provided with mixing elements arranged between the aerosol distributor and the filter (not shown in figures). The mixing elements may for example be in the form of a series of spaced apart parallel bars or a grid arranged perpendicular to the general airflow direction in order to effect mixing of the passing air.

During testing operation, the aerosol source feeds a testing aerosol, e.g. comprising a dioctyl phthalate (DOP), di-ethyl-hexyl-sebacat (DENS) or poly alpha olefins (PAO), to the inlet of the distributor housing at a pressure in the range of about 0.1 bar to about 5 bar, preferably in the range of about 0.2 bar to about 3 bar. The aerosol flows via the aerosol port 12 and through the connecting tube 13 via the one-way flow rotating joint 27 into the aerosol distributor housing 21 as described above with reference to FIGS. 2-3. The aerosol enters the distributor housing 21 via the inlet 28 arranged at the hub chamber 22 and leaves the distributor housing through the outlet holes 30 of the radial chambers 23. The distributor housing of the aerosol distributor is rotated at a rotational speed in the range of about 800 rpm to about 1200 rpm by the motor 25 and the aerosol dispensed through the outlet holes 30 of the radial chambers 23 is evenly distributed and mixed with the airflow by the rotating motion of the distributor housing 21.

The downstream test section 5 is arranged between the downstream surface of the filter 10 in the filter housing section 4 and the airflow outlet aperture 7 and includes a duct forming a passageway directing the airflow from the filter 10 to the airflow outlet aperture 7. An aerosol sampling 15 probe is arranged in the passageway. The aerosol sampling probe 15 is positioned in the gas stream downstream of the filter 10 for sampling gas from the gas stream to be analyzed for the presence of test aerosol. By a connecting tube 17, the sampling probe 15 can be connected to and in fluid communication with a sampling port 16 arranged through the filter housing wall. During testing, a portion of the gas stream is withdrawn from the duct through the sampling probes 9, 15 and conveyed to an external instrument 18, such as a photometer or a particle counter, or the like, which is used to determine the aerosol concentration in both the upstream and downstream samples. The aerosol concentration measured in the samples collected through the downstream sampling probe 15 may optionally be compared to an aerosol concentration measured in the samples collected through the upstream sampling probe 9.

The downstream sampling probe 15 may be movable in a plane parallel to the filter surface, such that the filter surface can be scanned using the sampling probe. This type of sampling probe allows detection of not only the existence of a leak, but can also give rough indication as to the position of the leak on the filter surface.

A typical sampling probe is made of a tube with several inlet holes through the tube wall distributed along the length of the sampling probe, and a central outlet connected to the downstream sampling port. Different concepts for moving the probe to scan the filter surface have been developed. One concept uses an elongated sampling probe, which extends along the length or width of the filter and is movable back and forth in a direction perpendicular to its longitudinal extension by means of a manual or motor driven mechanism like a cylinder, a power screw or other suitable mechanism, to scan the area in the vicinity of the filter surface.

While the invention has been described herein with reference to various exemplary embodiments, it will be understood by those skilled in the art that various changes may be made and equivalents may be substituted for elements thereof without departing from the scope of the invention. In addition, many modifications may be made to adapt a particular situation or feature to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Furthermore, it would be understood by the person skilled in the art what features of the different embodiments can be combined although not explicitly written above without departing from the basic scope thereof, and the scope thereof is determined by the claims that follow.

What is claimed is:

1. An aerosol distributor for filter leakage detection in a gas filtration system, said aerosol distributor being configured to be positioned in a gas stream upstream of the filter, said aerosol distributor comprising:
    a rotatable distributor housing comprising a hub in fluid connection with two or more radial chambers evenly distributed around said hub, the rotatable distributor housing comprising:
        an inlet for admitting a test aerosol from an aerosol source via the hub into the radial chambers, each radial chamber being elongated, sealed at a distal end, and provided with a plurality of outlet holes distributed along the length thereof for releasing the aerosol from the radial chamber into a gas stream surrounding the aerosol distributor, and wherein said aerosol distributor further comprises:
        an aerosol source capable of feeding a test aerosol to the inlet of the distributor housing; and
        an actuator configured to rotate the distributor housing around a central axis thereof.

2. The aerosol distributor according to claim 1, wherein the actuator is configured to rotate the distributor housing at a rotational speed in the range of about 100 rpm to about 10000 rpm.

3. The aerosol distributor according to claim 1, wherein the actuator is an electric motor or a pneumatic motor.

4. The aerosol distributor according to claim 1, wherein the distributor housing comprises 2-20 radial chambers.

5. The aerosol distributor according to claim 1, wherein the outlet holes are arranged on surfaces of the radial chambers that constitute trailing surfaces of the radial chambers in an operational state.

6. The aerosol distributor according to claim 1, wherein the radial chambers are tubular.

7. The aerosol distributor according to claim 1, wherein the length of the radial chambers is in the range of about 100 mm to about 1000 mm.

8. The aerosol distributor according to claim 1, wherein the aerosol source is capable of feeding the test aerosol to the inlet of the distributor housing at a pressure in the range of about 0.1 bar to about 5 bar.

9. An arrangement for filter leakage detection in a gas filtration system, comprising:
    a filter housing for sealably mounting a filter within said filter housing such that a gas stream passing through the filter housing passes through the filter, and
    an aerosol distributor mounted in the gas stream upstream of the filter for releasing a test aerosol from an aerosol source into the gas stream, wherein the aerosol distributor further comprises:
        an actuator configured to rotate the distributor housing around a central axis thereof.

10. The arrangement according to claim 9, wherein the filter housing is cylindrical and has an axial flow path.

11. The arrangement according to claim 9, wherein the aerosol distributor housing is configured to rotate around a central axis thereof, which coincides with a central axis of the filter housing.

12. The arrangement according to claim 9, wherein the distance of said aerosol distributor from said filter is in the range of about 50 mm to about 500 mm.

13. The arrangement according to claim 9, further comprising:
    a sampling probe positioned in the gas stream downstream of the filter for sampling gas from the gas stream to be analyzed for the presence of test aerosol.

14. The arrangement according to claim 13, wherein the sampling probe is movable in a plane parallel to the filter surface, such that the filter surface can be scanned using the sampling probe.

15. The arrangement according to claim 13, wherein the distance of sampling probe from said filter is in the range of about 5 mm to about 100 mm.

16. A method of filter leakage detection in a gas filtration system, the method comprising:
    a) distributing a test aerosol in a gas stream upstream of a filter;
    b) passing the gas stream containing the test aerosol through the filter; and
    c) sampling gas from the gas stream downstream of the filter and analyzing the gas for presence of test aerosol, wherein the test aerosol is distributed using an aerosol distributor further comprises:
        an actuator configured to rotate the distributor housing around a central axis thereof.

17. A method according to claim 16, wherein the gas filtration system is further defined as in claim 9.

18. A method according to claim 16, wherein the actuator rotates the distributor housing at a rotational speed in the range of about 100 rpm to about 10000 rpm.

* * * * *